(12) United States Patent
Li et al.

(10) Patent No.: US 10,361,963 B2
(45) Date of Patent: Jul. 23, 2019

(54) CONTROLLING A CONGESTION WINDOW SIZE

(71) Applicant: Verizon Patent and Licensing Inc., Arlington, VA (US)

(72) Inventors: Feng Li, Lexington, MA (US); Jae Won Chung, Lexington, MA (US); Haim S. Ner, Fair Lawn, NJ (US); Eduard Rubinshtein, Belmont, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 239 days.

(21) Appl. No.: 15/150,778

(22) Filed: May 10, 2016

(65) Prior Publication Data

US 2017/0331753 A1 Nov. 16, 2017

(51) Int. Cl.
*H04L 12/807* (2013.01)
*H04L 12/26* (2006.01)
*H04L 12/835* (2013.01)
*H04L 29/06* (2006.01)

(52) U.S. Cl.
CPC .......... *H04L 47/27* (2013.01); *H04L 43/0829* (2013.01); *H04L 43/0864* (2013.01); *H04L 43/16* (2013.01); *H04L 47/30* (2013.01); *H04L 69/16* (2013.01)

(58) Field of Classification Search
CPC . H04L 69/16; H04L 43/0841; H04L 43/0864; H04L 43/16; H04L 47/27; H04L 47/30
See application file for complete search history.

(56) References Cited

U.S. PATENT DOCUMENTS

| 2005/0022089 A1* | 1/2005 | Le | H04L 1/0001 714/749 |
| 2007/0008884 A1* | 1/2007 | Tang | H04L 29/06 370/230 |
| 2011/0122771 A1* | 5/2011 | Joshi | H04J 3/0682 370/236 |
| 2012/0236718 A1* | 9/2012 | Noureddin | H04L 47/12 370/235 |
| 2016/0212031 A1* | 7/2016 | Jain | H04L 43/0876 |

OTHER PUBLICATIONS

Zaki et al. "Adaptive Congestion Control for Unpredictable Cellular Networks," https://cs.nyu.edu/~jchen/publications/sigcomm15-zaki.pdf, Aug. 17, 2015, 14 pages.
Paxson et al. "Computing TCP's Retransmission Timer," file:///Y:/0011%20(Verizon)/1824%20(20160109)/Refs/rfc2988.pdf, Nov. 2000, 8 pages.

* cited by examiner

*Primary Examiner* — Kevin C. Harper
*Assistant Examiner* — Derrick V Rose

(57) ABSTRACT

A device may determine one or more round-trip time threshold values and may determine a round-trip time value associated with a flow. The device may determine a smoothed round-trip time value based on the one or more round-trip time threshold values and the round-trip time value. The device may determine a congestion window threshold value based on the smoothed round-trip time value and may determine a congestion window value based on the congestion window threshold value. The device may provide traffic associated with the flow based on the congestion window value.

20 Claims, 8 Drawing Sheets

CONTROLLING A CONGESTION WINDOW SIZE

BACKGROUND

In the Transmission Control Protocol (TCP), a congestion window is a flow control mechanism that is based on a network capacity and/or a network loading condition. The congestion window may prevent a link between a server device and a client device from becoming overloaded with network traffic. Additionally, the congestion window may be calculated based on estimating congestion between the server device and the client device.

DETAILED DESCRIPTION OF PREFERRED EMBODIMENTS

Figure 1A:
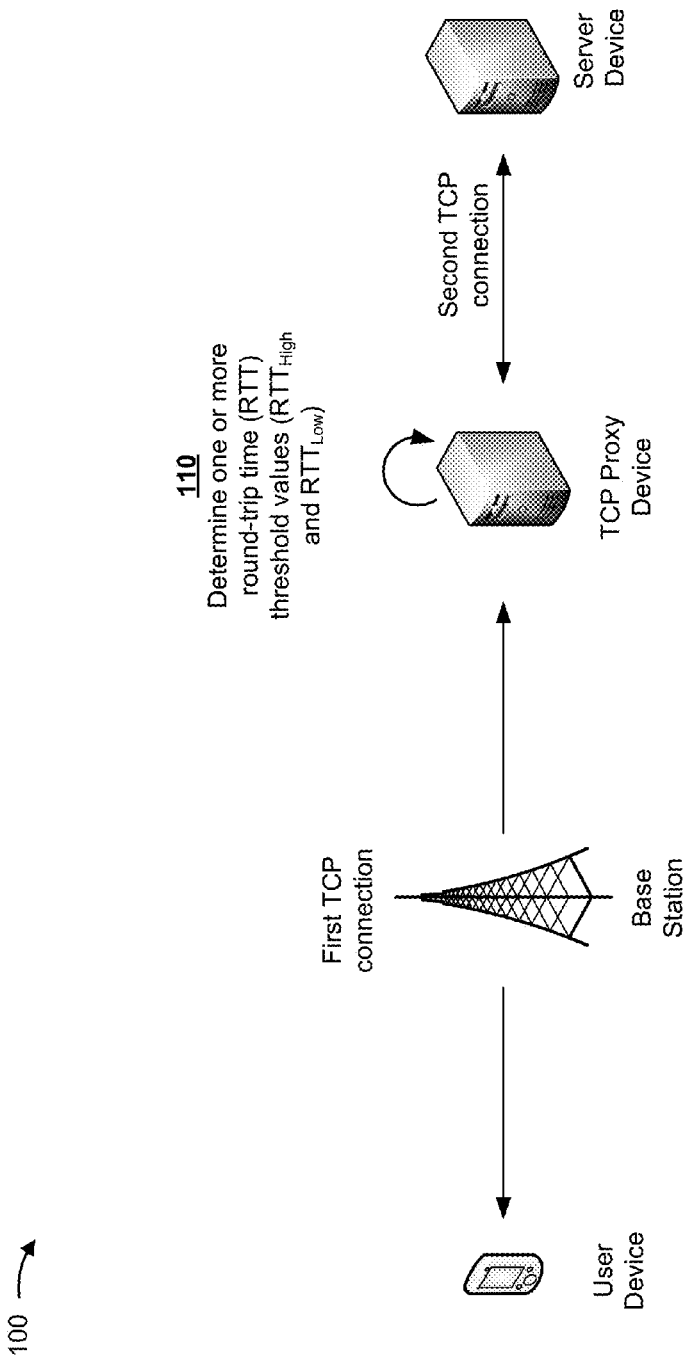
FIGS. 1A-1E are diagrams of an overview of an example implementation described herein.

The following detailed description of example implementations refers to the accompanying drawings. The same reference numbers in different drawings may identify the same or similar elements.

In wireless networks, particular TCP network congestion-avoidance control algorithms may inaccurately and/or falsely estimate network congestion, thereby causing reduced throughput based on limiting a transmit rate between devices. For example, wireless transmission may result in packet loss and/or oscillating round-trip times without the underlying cause being attributable to network congestion. In such cases, a server device may reduce a transmit rate based on erroneously or falsely estimating network congestion.

Additionally, in some cases, a user device, such as a mobile phone, may request content, such as a webpage, from a server device via a TCP connection. In some cases, the content may be associated with a particular file size (e.g., less than one megabyte). In such cases, the TCP network congestion-avoidance control algorithm may cause the server device to provide the content in an inefficient manner (e.g., by iteratively increasing a congestion window size). Thus, a majority of the duration of the TCP connection may be associated with TCP slow start, which is a TCP transition phase (e.g., associated with increasing the congestion window size). Additionally, in some cases, a wired network portion of a TCP connection may be associated with faster transmission rates than a radio access network portion of the TCP connection, which may cause bursts of traffic towards the user device that may trigger packet loss associated with the radio access network, or the like.

Implementations described herein may enable a TCP proxy device to split a TCP path between a server device and a client device into two TCP paths. For example, the TCP proxy device may split a TCP path into a first TCP path between the server device and the TCP proxy device (e.g., a fast TCP path), and a second TCP path between the TCP proxy device and the client device (e.g., a slow TCP path). By splitting the TCP paths into multiple paths, the TCP proxy device may reduce a server device to client device round-trip time (RTT) (e.g., because the server device to TCP proxy device RTT is negligible as compared to the TCP proxy device to the client device RTT).

Implementations described herein may enable a TCP proxy device to control a congestion window size based on monitoring round-trip times between the TCP proxy device and a client device. Implementations described herein may enable the TCP proxy device to estimate network bandwidth-delay product (BDP) and network congestion and control a congestion window size based on the RTTs between the TCP proxy device and the client device, thereby controlling a transmit rate of the TCP proxy device. In this way, implementations described herein may reduce an overall RTT, may increase throughput, may reduce download times, may reduce packet loss, and/or may increase the efficiency of a TCP connection. In this way, implementations described herein may conserve processor and/or memory resources associated with a user device, a server device, a TCP proxy device, and/or a traffic transfer device. Additionally, implementations described herein may conserve network resources.

FIGS. 1A-1E are diagrams of an overview of an example implementation 100 described herein. As shown in FIG. 1A, and by reference number 110, a TCP proxy device (e.g., a server device) may determine one or more round-trip time (RTT) threshold values. For example, the TCP proxy device may determine a high RTT threshold value ($RTT_{High}$) and a low RTT threshold value ($RTT_{Low}$) based on an initial RTT value, as described in more detail elsewhere herein. For example, assume that a user device (e.g., a mobile phone) requests content from a server device (e.g., a server). In some implementations, the TCP proxy device may cause a first TCP connection to be established with the user device, and may cause a second TCP connection to be established with the server device. Additionally, or alternatively, the TCP proxy device may determine the initial RTT value based on a "three-way-handshake" process with the user device (e.g., based on comparing timestamps associated with a synchronize (SYN) message, a synchronize-acknowledgment (SYN-ACK) message, and/or an acknowledgment (ACK) message).

Figure 1B:
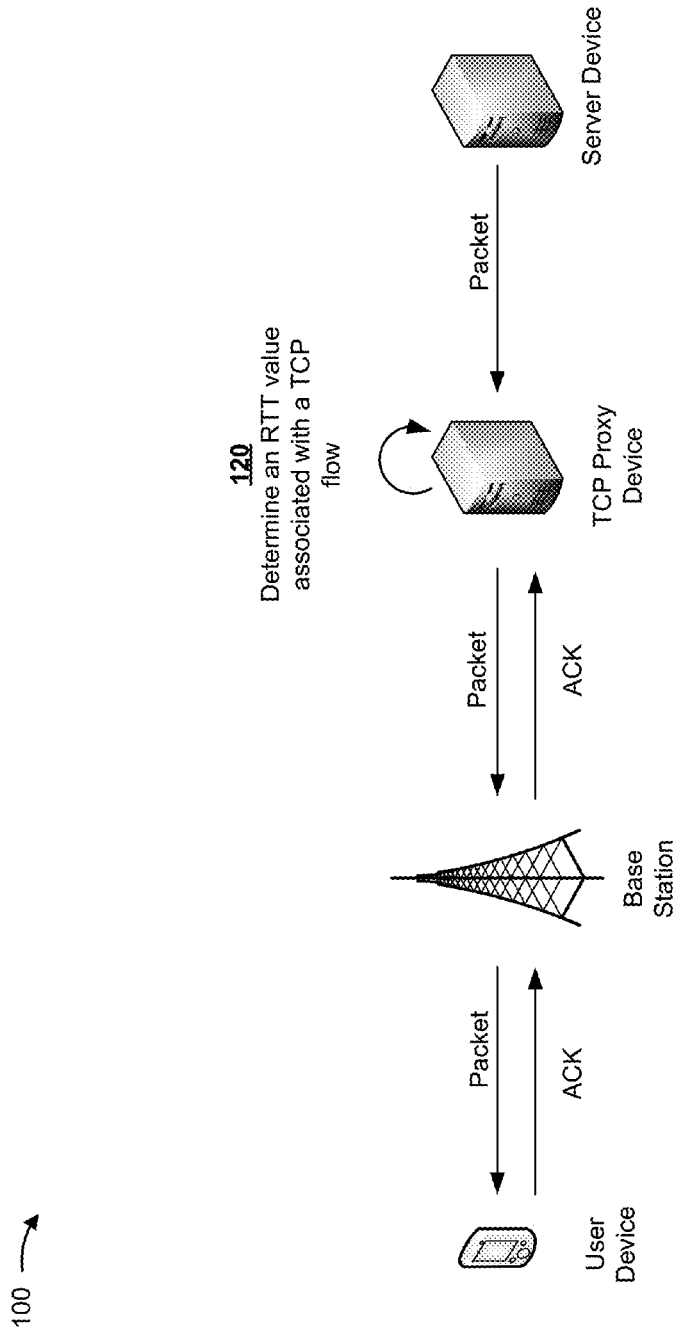

As shown in FIG. 1B, and by reference number 120, the TCP proxy device may determine an RTT value associated with a TCP flow. For example, the TCP proxy device may cause a first TCP flow to be established with the user device, and may cause a second TCP flow to be established with the server device. In this way, the TCP proxy device may receive traffic from the server device and may provide traffic to the user device (or vice versa). In some implementations, the TCP proxy device may determine the RTT value based on providing a packet to the user device and receiving an ACK message from the user device.

Figure 1C:
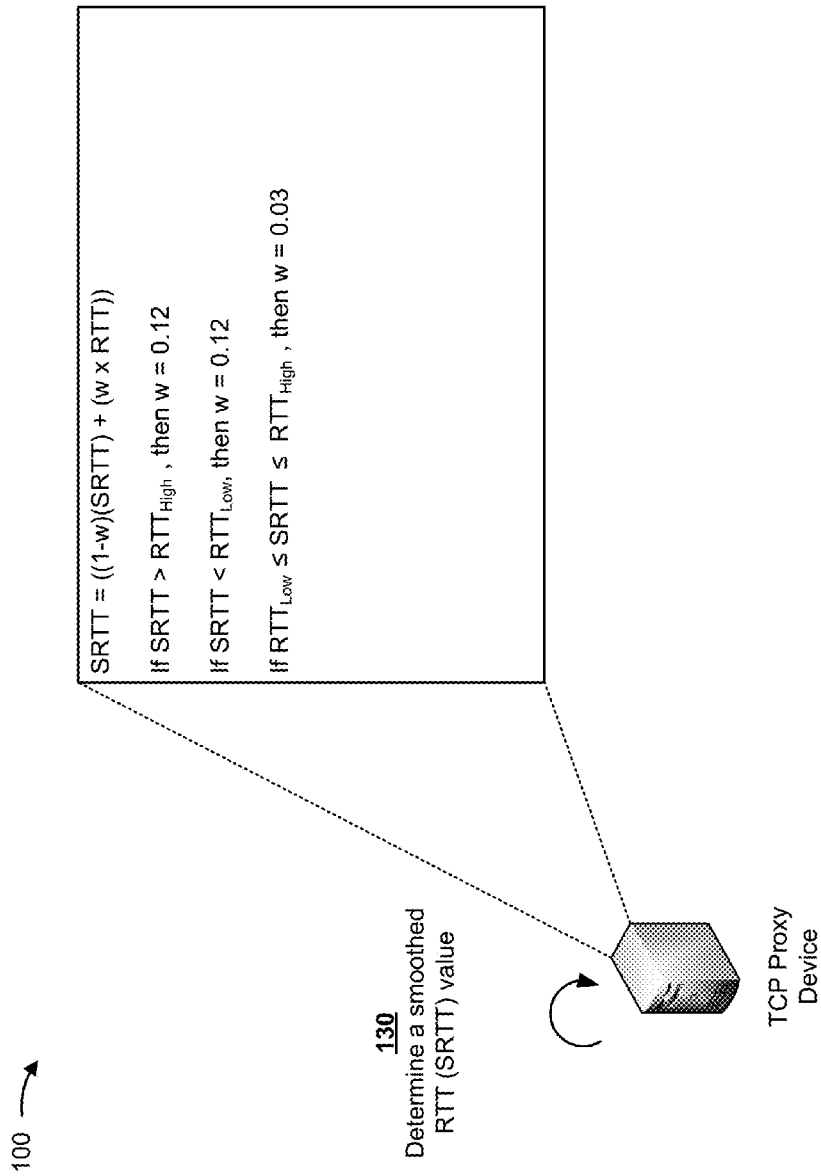

As shown in FIG. 1C, and by reference number 130, the TCP proxy device may determine a smoothed RTT (SRTT) value. For example, the TCP proxy device may determine an SRTT value based on the RTT value, the low RTT threshold value, the high RTT threshold value, a weight value (w), and/or an RTT low pass filter threshold value, as described in more detail elsewhere herein. For example, as shown in FIG. 1C, the TCP proxy device may determine the SRTT value based on the example equation and/or the example values.

Figure 1D:
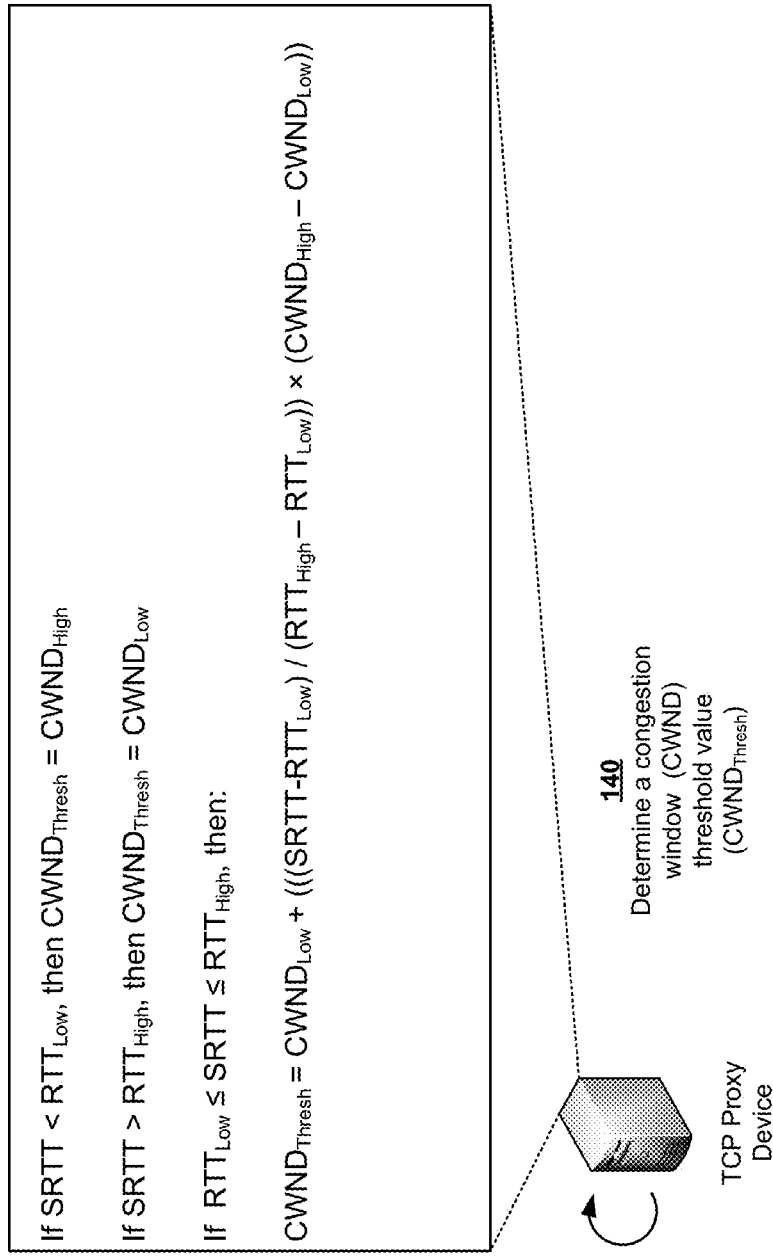

As shown in FIG. 1D, and by reference number 140, the TCP proxy device may determine a congestion window (CWND) threshold value based on the SRTT value. For example, the TCP proxy device may determine the CWND value based on the SRTT value, a high CWND limit (CWND$_{High}$), and/or a low CWND limit (CWND$_{Low}$), as shown in the example equation, and as described in more detail elsewhere herein. For example, the TCP proxy device may determine the CWND threshold value based on estimating network congestion (e.g., estimating a queue size associated with a base station). In this way, the TCP proxy device may control a congestion window value based on a network condition.

Figure 1E:
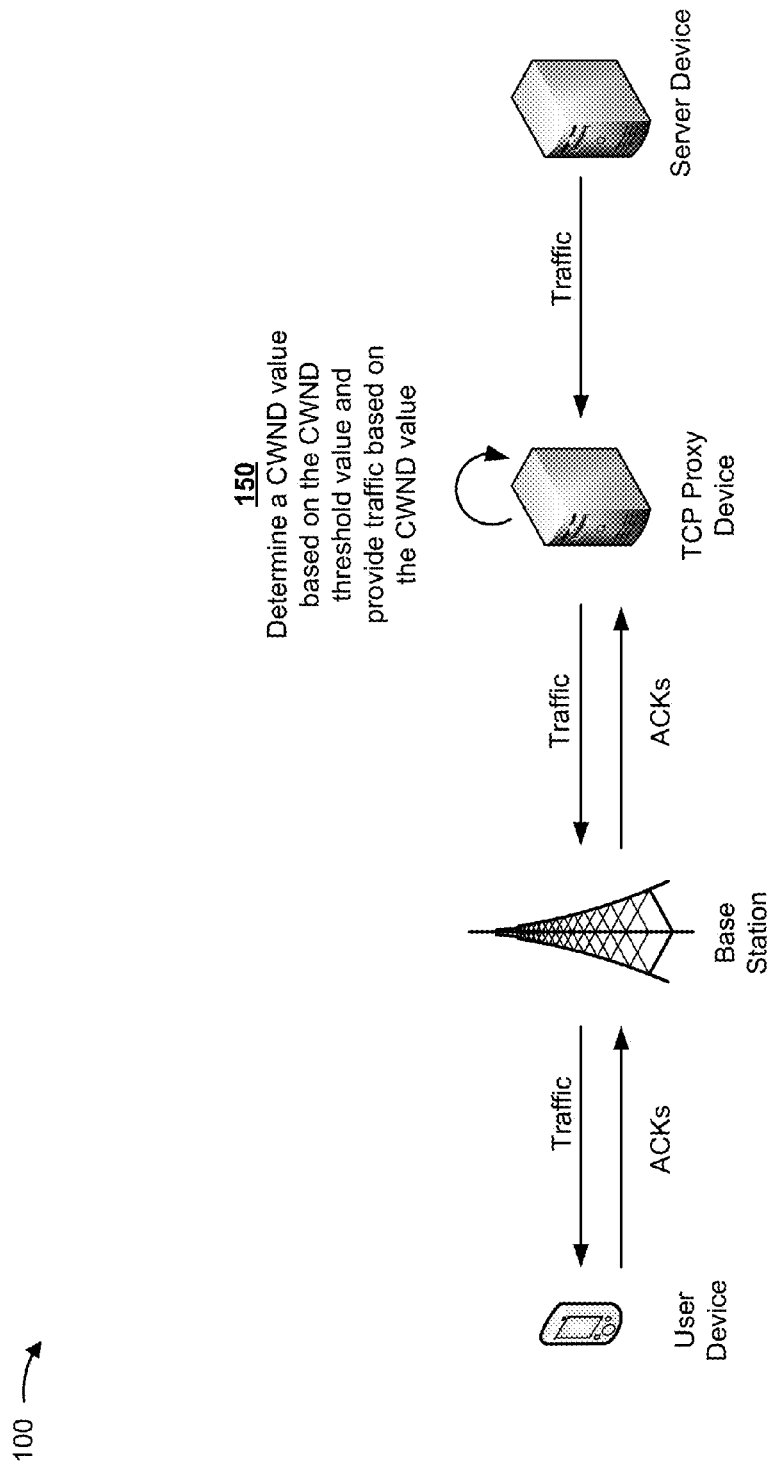

As shown in FIG. 1E, and by reference number 150, the TCP proxy device may determine a CWND value based on the CWND threshold value and may provide traffic (e.g., packets) based on the CWND value. For example, the TCP proxy device may include an initial CWND value, and may increase the initial CWND value based on receiving ACK messages from the user device. In this way, the TCP proxy device may include an actual CWND value that may vary based on a duration of the TCP flow. In some implementations, the TCP proxy device may determine a CWND value based on determining a minimum of an actual CWND value and the CWND threshold value.

In this way, the TCP proxy device may control a congestion window value based on monitoring RTTs between the TCP proxy device and the user device. Implementations described herein may enable the TCP proxy device to improve throughput by controlling a congestion window value based on network conditions (e.g., congestion). Implementations described herein may improve throughput and/or reduce packet loss, thereby conserving processor and/or memory resources of a TCP proxy device, a base station, and/or a user device. Additionally, implementations described herein may conserve network resources by limiting a transmit rate of a TCP proxy device based on a network condition and/or providing traffic in an efficient manner (e.g., maximizing radio link utilization).

As indicated above, FIGS. 1A-1E are provided merely as an example. Other examples are possible and may differ from what was described with regard to FIGS. 1A-1E.

Figure 2:
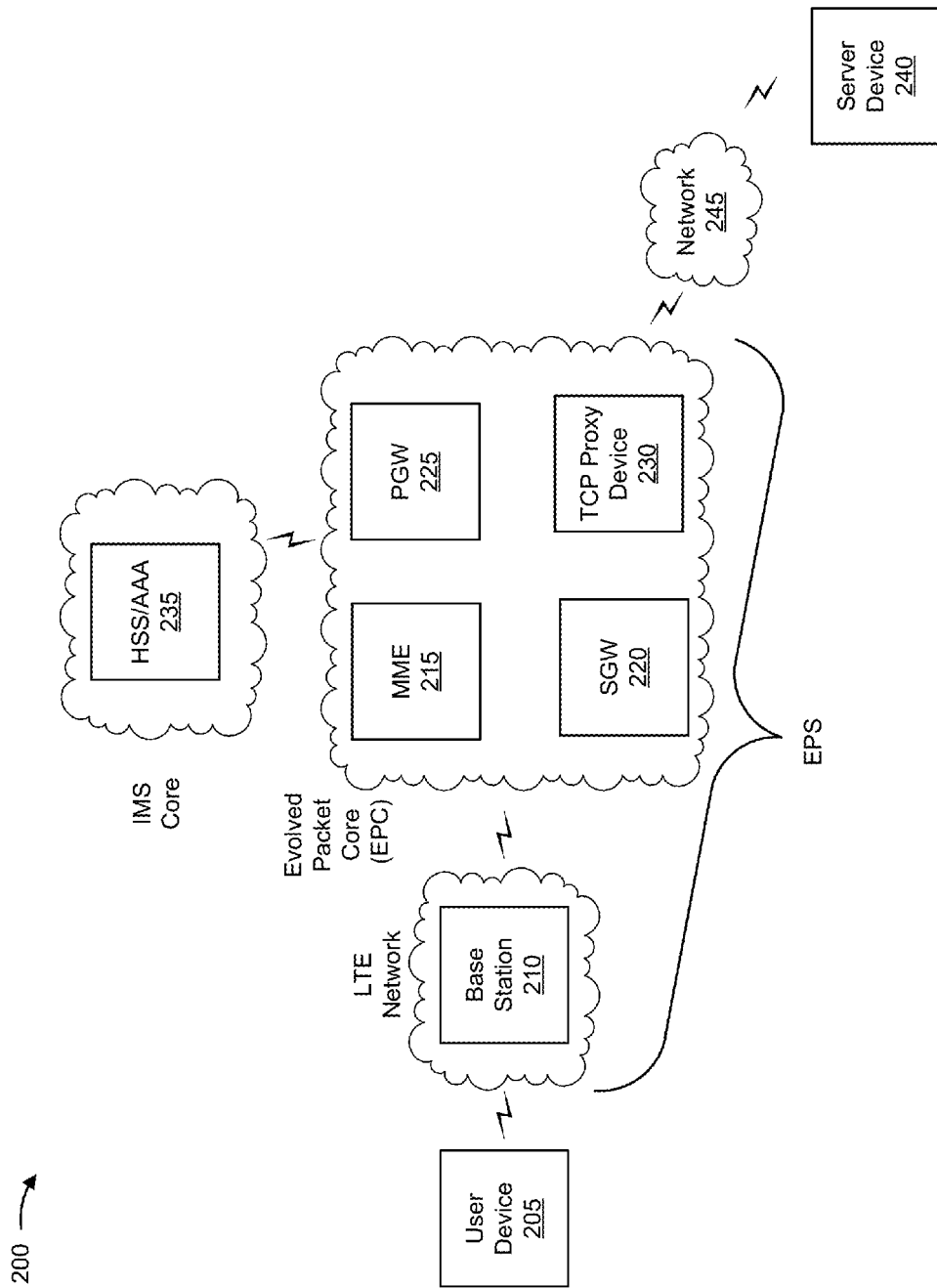
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205; a base station 210; a mobility management entity device (MME) 215; a serving gateway (SGW) 220; a packet data network gateway (PGW) 225; a TCP proxy device 230; a home subscriber service/authentication, authorization, and accounting server (HSS/AAA) 235; a server device 240, and a network 245. Devices of environment 200 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network or a code division multiple access (CDMA) network.

Environment 200 may include an evolved packet system (EPS) that includes an LTE network and/or an evolved packet core (EPC) that operate based on a 3GPP wireless communication standard. The LTE network may include a radio access network (RAN) that includes one or more base stations 210 that take the form of evolved Node Bs (eNBs) via which user device 205 communicates with the EPC. The EPC may include MME 215, SGW 220, PGW 225, and/or TCP proxy device 230 that enable user device 205 to communicate with network 245 and/or an Internet protocol (IP) multimedia subsystem (IMS) core. The IMS core may include HSS/AAA 235, and may manage device registration and authentication, session initiation, etc., associated with user devices 205. HSS/AAA 235 may reside in the EPC and/or the IMS core.

User device 205 includes one or more devices capable of connecting to a network via base station 210. For example, user device 205 may include a communication device, such as a mobile phone (e.g., a smart phone or a radiotelephone) a tablet computer, a wearable communication device (e.g., a smart wristwatch or a pair of smart eyeglasses), or a similar type of device. User device 205 may send traffic to and/or receive traffic from network 245 via base station 210 (e.g., based on a radio access bearer between user device 205 and SGW 220).

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a RAN that is not associated with an LTE network. Base station 210 may send traffic to and/or receive traffic from user device 205 via an air interface (e.g., a radio frequency (RF) signal). In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. Additionally, or alternatively, SGW 220 may receive traffic from network 245 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network), such as network 245. For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to user device 205 via SGW 220 and base station 210. PGW 225 may record data usage information (e.g., byte usage), and may provide the data usage information to HSS/AAA 235.

TCP proxy device 230 includes one or more devices capable of receiving, storing, processing, and/or providing information associated with a congestion window value. For example, TCP proxy device 230 may include a server device (e.g., a TCP proxy server), a cloud computing device, or a similar device. In some implementations, TCP proxy device 230 may receive traffic from server device 240 (e.g., via network 245) and may provide the traffic to user device 205 (e.g., via base station 210).

HSS/AAA 235 includes one or more devices, such as one or more server devices, capable of managing (e.g., receiving, generating, storing, processing, and/or providing) information associated with user device 205. For example, HSS/AAA 235 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), information that identifies whether user device 205 is associated with an RF access signaling usage control policy and/or an RF access signaling usage billing policy, and/or similar information. HSS/AAA 235 may provide this information to one or more other devices of environment 200 to support the operations performed by those devices.

Additionally, or alternatively, HSS/AAA 235 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, RF access signaling usage restrictions, etc.), may track resources consumed by user device 205 (e.g., a quantity of voice minutes consumed, a quantity of data consumed, a quantity of RF signals transmitted, a quantity of radio access bearers requested and/or established, etc.), and/or may perform similar operations.

Server device 240 includes one or more devices capable of providing content. For example, server device 240 may include a server device (e.g., a host server, a web server, an application server, etc.), a cloud computing device, or a similar device. For example, server device 240 may provide video, audio, images, webpages, text, data, and/or some combination thereof.

Network 245 may include one or more wired and/or wireless networks. For example, network 280 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
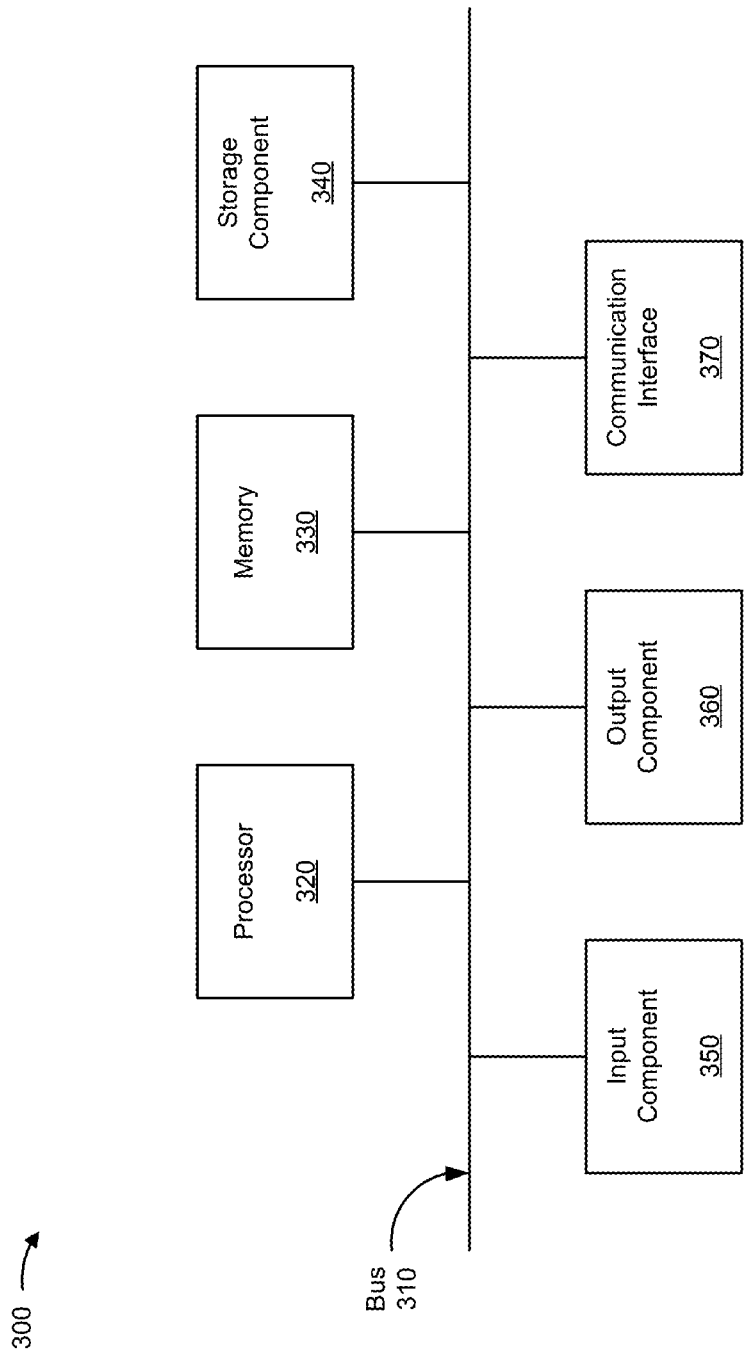
FIG. 3 is a diagram of example components of one or more devices of FIG. 2.

FIG. 3 is a diagram of example components of a device 300. Device 300 may correspond to user device 205, base station 210, MME 215, SGW 220, PGW 225, TCP proxy device 230, HSS/AAA 235, and/or server device 240. In some implementations, user device 205, base station 210, MME 215, SGW 220, PGW 225, TCP proxy device 230, HSS/AAA 235, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS)

component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
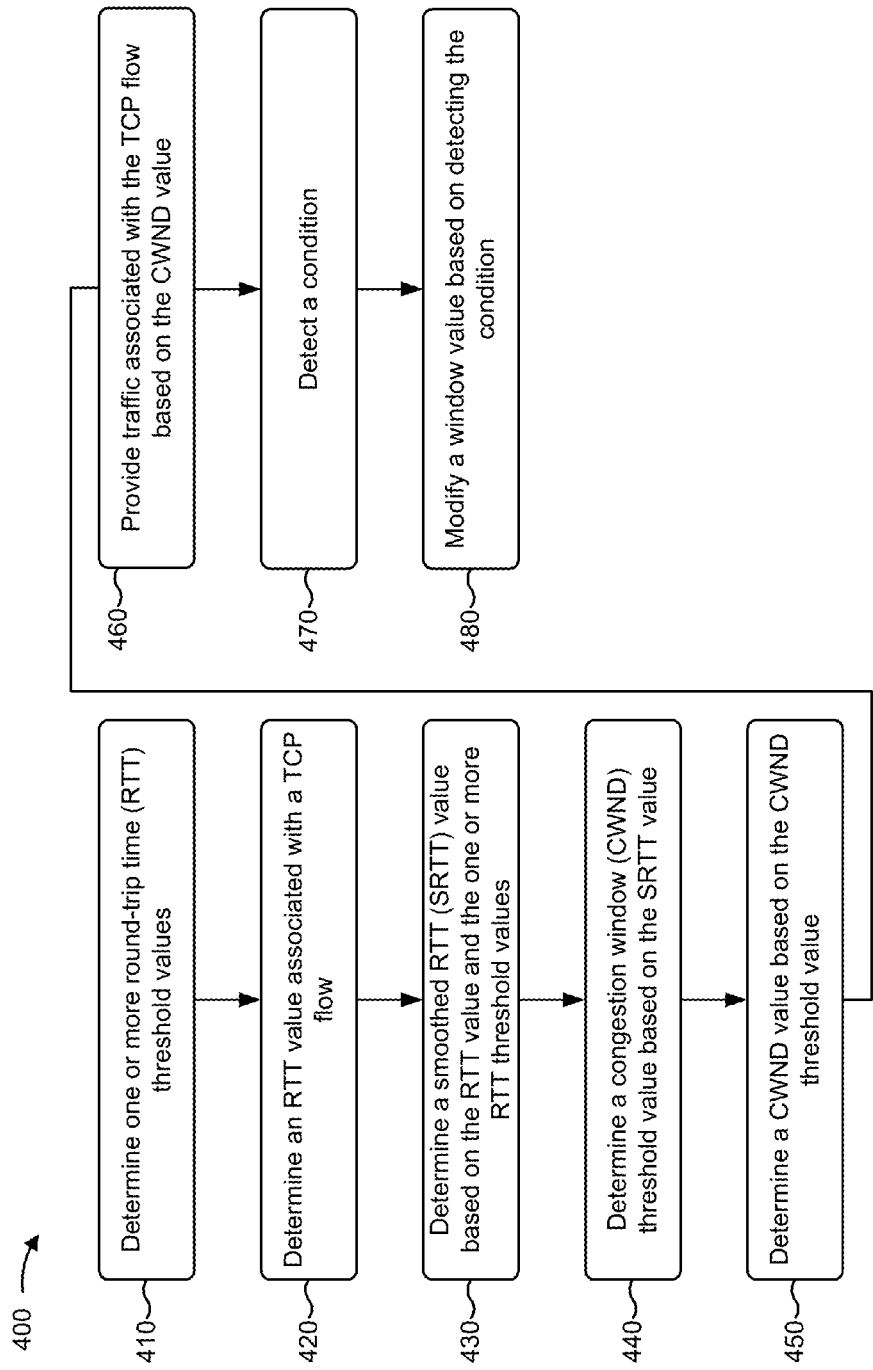
FIG. 4 is a flow chart of an example process for controlling a congestion window size.

FIG. 4 is a flow chart of an example process 400 for controlling a congestion window size. In some implementations, one or more process blocks of FIG. 4 may be performed by TCP proxy device 230. In some implementations, one or more process blocks of FIG. 4 may be performed by another device or a group of devices separate from or including TCP proxy device 230, such as user device 205, base station 210, MME 215, SGW 220, PGW 225, HSS/AAA 235, and/or server device 240.

As shown in FIG. 4, process 400 may include determining one or more round-trip time (RTT) threshold values (block 410). For example, TCP proxy device 230 may determine a high RTT threshold value and a low RTT threshold value based on a TCP flow. In some implementations, a TCP flow may include a sequence of packets associated with a TCP connection. As used herein, a packet may refer to a communication structure for communicating information, such as a protocol data unit (PDU), a packet, a frame, a datagram, a segment, a message, a block, a cell, a subframe, a slot, a symbol, a portion of any of the above, and/or another type of formatted or unformatted unit of data capable of being transmitted via a network. In some implementations, an RTT may include an amount of time for traffic to be sent and acknowledged between devices (e.g., between user device 205 and TCP proxy device 230, between user device 205 and server device 240, and/or between TCP proxy device 230 and server device 240).

In some implementations, the TCP flow may include a connection between user device 205 and TCP proxy device 230. Additionally, or alternatively, the TCP flow may include a connection between TCP proxy device 230 and server device 240. Additionally, or alternatively, TCP proxy device 230 may receive and/or monitor traffic associated with the TCP flow. For example, TCP proxy device 230 may monitor traffic during a creation of a TCP connection between user device 205 and TCP proxy device 230 (e.g., during a "three-way-handshake" process).

In some implementations, TCP proxy device 230 may determine the high RTT threshold value and the low RTT threshold value during the creation of the TCP connection between user device 205 and TCP proxy device 230. For example, TCP proxy device 230 may determine the high RTT threshold value and the low RTT threshold value based on messages (e.g., a SYN message, a SYN-ACK message, and/or an ACK message) associated with a "three-way-handshake" process. In some implementations, TCP proxy device 230 may determine an initial RTT value based on a SYN message and a SYN-ACK message. For example, TCP proxy device 230 may generate a first timestamp based on providing the SYN message to user device 205, and may generate a second timestamp based on receiving the SYN-ACK message from user device 205. Additionally, or alternatively, TCP proxy device 230 may determine the initial RTT value based on the first timestamp and the second timestamp (e.g., based on a difference between the first timestamp and the second timestamp).

In some implementations, TCP proxy device 230 may determine the low RTT threshold value based on comparing the initial RTT value, a low RTT threshold value high bound, and/or a low RTT threshold value low bound. In some implementations, the low RTT threshold value low bound (e.g., 30 ms, 35 ms, 40 ms, etc.) and/or the low RTT threshold value high bound (e.g., 60 ms, 65 ms, 70 ms, etc.) may include a user-configurable value(s) or a value(s) set based on network conditions or a type of network. In some implementations, if the initial RTT value is greater than (or greater than or equal to) the low RTT threshold value high bound, then TCP proxy device 230 may determine that the low RTT threshold value is the low RTT threshold value high bound. Alternatively, if the initial RTT value is less than (or less than or equal to) the low RTT threshold value low bound, then TCP proxy device 230 may determine that the low RTT threshold value is the low RTT threshold value low bound. Alternatively, if the initial RTT value is less than (or less than or equal to) the low RTT threshold value high bound and greater than (or greater than or equal to) the low RTT threshold low bound, then TCP proxy device 230 may determine that the low RTT threshold value is the initial RTT value.

In some implementations, TCP proxy device 230 may determine the high RTT threshold value based on comparing the initial RTT value, a high RTT threshold value high bound, a high RTT threshold value low bound, and/or a high RTT threshold value multiplier. In some implementations, the high RTT threshold value low bound (e.g., 300 ms, 310 ms, 320 ms, etc.), the high RTT threshold value high bound (e.g., 450 ms, 460 ms, 470 ms, etc.), and/or the high RTT threshold value multiplier (e.g., n=11) may include a user-configurable value(s) or a value(s) set based on network conditions or a type of network. In some implementations, if a product (e.g., initial RTT×n) of the initial RTT value and the high RTT threshold value multiplier is greater than (or greater than or equal to) the high RTT threshold value high bound, then TCP proxy device 230 may determine that the high RTT threshold value is the high RTT threshold value high bound.

Alternatively, if the product of the initial RTT value and the high RTT threshold value multiplier is less than (or less than or equal to) the high RTT threshold value low bound, then TCP proxy device 230 may determine that the high RTT threshold value is the high RTT threshold value low bound. Alternatively, if the product of the initial RTT value and the high RTT threshold value multiplier is less than (or less than or equal to) the high RTT threshold value high bound and greater than (or greater than or equal to) the high RTT threshold value low bound, then TCP proxy device 230 may determine that the high RTT threshold value is the product of the initial RTT value and the high RTT threshold value multiplier. In this way, TCP proxy device 230 may determine a high RTT threshold value and a low RTT threshold value based on an RTT value for a TCP flow between user device 205 and TCP proxy device 230.

As further shown in FIG. 4, process 400 may include determining an RTT value associated with a TCP flow (block 420). For example, TCP proxy device 230 may determine an RTT value associated with a TCP flow. In some implementations, the TCP flow may include a flow between TCP proxy device 230 and user device 205. In some implementations, TCP proxy device 230 may cause a first TCP connection to be established with user device 205 and a second TCP connection to be established with server device 240. In this way, TCP proxy device 230 may separately control a rate of traffic transmission between TCP proxy device 230 and user device 205, and/or between TCP proxy device 230 and server device 240, as described elsewhere herein.

In some implementations, TCP proxy device 230 may determine the RTT value associated with the TCP flow based on comparing timestamps. For example, TCP proxy device 230 may generate a first timestamp based on sending a packet to user device 205, and may generate a second timestamp based on receiving, from user device 205, an ACK message associated with the packet. Additionally, or alternatively, TCP proxy device 230 may determine the RTT value based on comparing the first timestamp and the second timestamp.

As further shown in FIG. 4, process 400 may include determining a smoothed RTT (SRTT) value based on the RTT value and the one or more RTT threshold values (block 430). For example, TCP proxy device 230 may determine a smoothed RTT value based on the RTT value, the one or more RTT threshold values, a weight value (e.g., an exponentially weighted moving average (EWMA) weight value, a moving average weight value, or the like), and/or an RTT low pass filter threshold value (e.g., 700 ms, 710 ms, 720 ms, etc.). For example, TCP proxy device 230 may determine the SRTT value based on the example equation below:

$$SRTT = ((1-w) \times SRTT) + (w \times RTT)$$

In some implementations, if the RTT value is greater than (or greater than or equal to) the RTT low pass filter threshold value, then TCP proxy device 230 may apply a first weight value (e.g., 0.01, 0.02, 0.03, etc.) when determining the SRTT value. In this way, the RTT low pass filter threshold value may reduce an effect of an outlier RTT value (e.g., a high RTT value), thereby improving consistent throughput.

In some implementations, TCP proxy device 230 may determine that the SRTT value is equal to the RTT value when determining the first SRTT value (e.g., when determining the first SRTT value associated with the TCP flow). In some implementations, if the SRTT value is greater than (or greater than or equal to) the high RTT threshold value, then TCP proxy device 230 may apply a second weight value (e.g., 0.12, 0.13, 0.14, etc.) when determining the SRTT value. Alternatively, if the SRTT value is less than (or less than or equal to) the low RTT threshold value, then TCP proxy device 230 may apply the second weight value (e.g., 0.12, 0.13, 0.14, etc.) when determining the SRTT value. In this way, TCP proxy device 230 may apply the second weight value to the SRTT value to control additional RTT values, as described in more detail elsewhere herein.

In some implementations, if the SRTT value is less than (or less than or equal to) the high RTT threshold value) and greater than (or greater than or equal to) the low RTT threshold value, then TCP proxy device 230 may apply a third weight value (e.g., 0.03, 0.04, 0.05, etc.) when determining the SRTT value. In this way, TCP proxy device 230 may apply the third weight value to minimize fluctuations in SRTT values.

As further shown in FIG. 4, process 400 may include determining a congestion window (CWND) threshold value based on the SRTT value (block 440). For example, TCP proxy device 230 may determine a CWND value based on the SRTT value, a high CWND limit, and/or a low CWND limit. In some implementations, the high CWND limit may include a particular value (e.g., a configurable value) and/or may include a value associated with an advertised receive window (RWND) associated with user device 205 (e.g., an RWND value or a percentage (e.g., 90%, 85%, 80%, etc.) of the RWND value). In some implementations, TCP proxy device 230 may determine an RWND value associated with user device 205, and may determine a high CWND limit based on the RWND value. Additionally, or alternatively, the low CWND limit may include a particular value (e.g., a configurable value), and/or may include a value associated with an advertised RWND value associated with user device 205 (e.g., a percentage of an RWND value). In some implementations, the CWND threshold value may represent a quantity of unacknowledged traffic that may be provided to user device 205. Additionally, or alternatively, an RWND value associated with user device 205 may represent a quantity of traffic that user device 205 may receive from TCP proxy device 230.

In some implementations, if the SRTT value is less than (or less than or equal to) the low RTT threshold value, then TCP proxy device 230 may determine that the CWND threshold value is the high CWND limit. For example, TCP proxy device 230 may classify the TCP flow into a first state (e.g., a "non-congested state"), and may set the CWND threshold value to the high CWND limit. In this way, TCP proxy device 230 may increase a transmit rate and may improve throughput, goodput, or the like.

In some implementations, if the SRTT value is greater than (or greater than or equal to) the high RTT threshold value, then TCP proxy device 230 may determine that the CWND threshold value is the low CWND limit. For example, TCP proxy device 230 may classify the TCP flow into a second state (e.g., a "congested state"), and may set the CWND threshold value to the low CWND limit. In this way, TCP proxy device 230 may limit a transmit rate based on estimating network congestion associated with base station 210, thereby preventing packet loss and/or retransmission timeouts. In this way, TCP proxy device 230 may prevent base station 210 from becoming congested, thereby conserving processor and/or memory resources of base station 210, and conserving network resources.

In some implementations, if the SRTT value is greater than (or greater than or equal to) the low CWND limit and less than (or less than or equal to) the high CWND limit, then TCP proxy device 230 may determine the threshold CWND value as shown below:

$$CWND_{Thresh} = CWND_{Low} + (((SRTT - RTT_{Low})/(RTT_{High} - RTT_{Low})) \times (CWND_{High} - CWND_{Low}))$$

For example, in the equation shown above, "$CWND_{Thresh}$" may represent the CWND threshold value, "$CWND_{High}$" may represent the high CWND limit, "$CWND_{Low}$" may represent the low CWND limit, "SRTT" may represent the SRTT value, "$RTT_{High}$" may represent the high RTT threshold value, and "$RTT_{Low}$" may represent the low RTT threshold value. In some implementations, TCP proxy device 230 may determine the CWND threshold value based on the above equation. For example, TCP proxy device 230 may classify the TCP flow into a third state (e.g., "pre-congestion state") and may limit a transmit rate, thereby preventing packet loss and/or retransmission timeouts. In this way, TCP proxy device 230 may estimate that base station 210 is becoming congested and may reduce a transmit rate to prevent further congestion, thereby conserving processor and/or memory resources associated with base station 210 and conserving network resources.

As further shown in FIG. 4, process 400 may include determining a CWND value based on the threshold CWND value (block 450), and providing traffic associated with the TCP flow based on the CWND value (block 460). For example, TCP proxy device 230 may determine a CWND value based on the threshold CWND value and an actual CWND value, and may provide traffic associated with the TCP flow based on the actual CWND value.

In some implementations, TCP proxy device 230 may include an initial CWND value. For example, TCP proxy device 230 may include an initial CWND value (e.g., a multiple of a maximum segment size (MSS)). In some implementations, TCP proxy device 230 may include a particular initial CWND value (e.g., 10 MSS, 20 MSS, etc.), and may increase (e.g., double) the CWND initial value based on receiving respective ACK messages from user device 205 (e.g., may perform a "slow-start" process). In this way, TCP proxy device 230 may include an actual CWND value that may vary based on a duration associated with the TCP flow.

In some implementations, TCP proxy device 230 may determine a CWND threshold value (e.g., may perform blocks 420-440) based on receiving ACK messages from user device 205 (e.g., based on receiving each respective ACK message or a threshold quantity of ACK messages).

In some implementations, TCP proxy device 230 may determine a CWND value based on comparing an actual CWND value with the threshold CWND value. For example, TCP proxy device 230 may determine a CWND value based on determining a minimum of an actual CWND value and a threshold CWND value. In some implementations, TCP proxy device 230 may adjust a transmit rate based on the CWND value. In this way, TCP proxy device 230 may provide, to user device 205, traffic associated with the TCP flow based on the threshold CWND value. Additionally, in this way, TCP proxy device 230 may control a transmit rate based on network congestion, thereby conserving processor and/or memory resources of base station 210, and conserving network resources.

As further shown in FIG. 4, process 400 may include detecting a condition (block 470), and modifying a window value based on detecting the condition (block 480). For example, TCP proxy device 230 may detect a condition associated with the TCP flow and may modify a CWND value and/or an RWND value based on detecting the condition.

In some implementations, TCP proxy device 230 may detect a packet loss associated with the TCP flow, and may enter a fast recovery state. For example, TCP proxy device 230 may detect a packet loss (e.g., based on an unacknowledged packet) and may set a CWND value to a percentage of the threshold CWND value (e.g., $\frac{2}{3}$, $\frac{1}{3}$, $\frac{2}{5}$, etc.) based on detecting the packet loss, a threshold quantity of packet losses, or the like. Additionally, or alternatively, TCP proxy device 230 may perform a slow-start process (e.g., double the CWND value based on receiving an ACK message) after setting the CWND value to the percentage of the threshold CWND value. In this way, TCP proxy device 230 may limit a transmit rate based on detecting a packet loss, thereby preventing additional packet loss. In this way, TCP proxy device 230 may conserve processor and/or memory resources of base station 210 and/or user device 205. Additionally, TCP proxy device 230 may improve throughput based on performing the slow-start process from the adjusted CWND value (e.g., $\frac{2}{3}$ of the threshold CWND value).

In some implementations, TCP proxy device 230 may detect a retransmission timeout and may set a CWND value to an initial CWND value (e.g., 10 MSS, 20 MSS, etc.). For example, TCP proxy device 230 may detect a retransmission timeout (e.g., based on a quantity of unacknowledged messages provided to user device 205), may set a CWND value to an initial CWND value, and may perform a slow-start process. In this way, TCP proxy device 230 may limit a transmit rate based on detecting packet loss, thereby preventing additional packet loss and/or network congestion. Additionally, in this way, processor and/or memory resources associated with base station 210 and/or user device 205, and/or network resources may be conserved.

In some implementations, TCP proxy device 230 may detect that a quantity of packets, associated with a buffer (e.g., an application buffer), satisfies a threshold, and may increase an RWND value. In some implementations, TCP proxy device 230 may be associated with multiple buffers. For example, TCP proxy device 230 may be associated with a first buffer (e.g., a receive buffer) that may store packets that are received from server device 240. Additionally, or alternatively, TCP proxy device 230 may be associated with a second buffer (e.g., a send buffer) that may store packets to be transmitted to user device 205. Additionally, or alternatively, TCP proxy device 230 may be associated with a third buffer (e.g., an application buffer) that may store packets that have been received from server device 240 and that have been acknowledged (e.g., by TCP proxy device 230).

In some implementations, TCP proxy device 230 may establish a TCP connection with user device 205, and may establish another TCP connection with server device 240. In this way, TCP proxy device 230 may control a transmit rate associated with server device 240 (e.g., based on adjusting an RWND value), and may independently control a transmit rate of TCP proxy device 230 to user device 205 (e.g., based on adjusting a CWND value). In some implementations, TCP proxy device 230 may receive packets from server device 240, and may store the packets in the third buffer (e.g., the application buffer). In this way, TCP proxy device 230 may increase efficiency of the TCP connection with user device 205 by providing user device 205 with a maximum quantity of packets that user device 205 may receive. For example, TCP proxy device 230 may adjust the RWND value to increase a transmit rate associated with server device 240, thereby allowing TCP proxy device 230 to maintain a threshold quantity of packets in the application buffer.

In some implementations, TCP proxy device 230 may detect that a quantity of packets associated with the third buffer satisfies a threshold, and may increase an RWND value. Additionally, or alternatively, TCP proxy device 230 may detect an increase in a CWND value, and may increase an RWND value. For example, TCP proxy device 230 may maintain a particular ratio between a CWND value and an RWND value. In this way, TCP proxy device 230 may allow server device 240 to increase a transmit rate towards TCP proxy device 230. Additionally, in this way, TCP proxy device 230 may maintain a threshold quantity of packets in the third buffer, thereby allowing TCP proxy device 230 and/or base station 210 to efficiently provide packets to user device 205 (e.g., maximize a radio link utilization).

Implementations described herein may enable TCP proxy device 230 to adjust a transmit rate based on monitoring RTT values (e.g., based on estimating network congestion). In this way, TCP proxy device 230 may increase a transmit rate based on estimating that the network is not congested, thereby improving throughput. Additionally, in this way, TCP proxy device 230 may limit a transmit rate based on estimating that the network is congested, thereby preventing further congestion and conserving processor and/or memory resources associated with base station 210 and/or user device 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable a TCP proxy device to control a CWND value based on monitoring RTTs associated with a TCP flow. In this way, the TCP proxy device may adjust a transmit rate based on a condition associated with a network. Implementations described herein may reduce a number of instances where a base station becomes congested, thereby conserving processor and/or memory resources associated with the base station and/or conserving network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
   determine a plurality of round-trip time threshold values,
   the plurality of round-trip time threshold values including a high round-trip time threshold value and a low round-trip time threshold value;
   determine a round-trip time value and a first smoothed round-trip time value,
   the round-trip time value and the first smoothed round-trip time value being associated with a flow,
   the flow being associated with the device and a user device;
   determine one or more weight values,
   the one or more weight values including one or more of:

a weight value based on comparing the round-trip time value to a round-trip time pass filter threshold value,
a weight value based on comparing the first smoothed round-trip time value to the high round-trip time threshold value, or
a weight value based on comparing the first smoothed round-trip time value to the low round-trip time threshold value;
determine a second smoothed round-trip time value based on the plurality of round-trip time threshold values, the round-trip time value, the first smoothed round-trip time value, and the one or more weight values;
determine a congestion window threshold value based on the second smoothed round-trip time value and at least one congestion window limit,
a congestion window limit, from the at least one congestion window limit, including a value associated with an advertise receive window associated with the user device;
determine a congestion window value based on the congestion window threshold value and the at least one congestion window limit; and
provide traffic associated with the flow based on the congestion window value.

2. The device of claim 1, where the one or more processors are further to:
compare the second smoothed round-trip time value and the plurality of round-trip time threshold values; and
where the one or more processors, when determining the congestion window threshold value, are further to:
determine the congestion window threshold value based on comparing the second smoothed round-trip time value and the plurality of round-trip time threshold values.

3. The device of claim 1, where the one or more processors are further to:
detect a packet loss associated with the flow; and
adjust the congestion window value to a different congestion window value based on detecting the packet loss.

4. The device of claim 1, where the one or more processors are further to:
determine another congestion window value;
detect a retransmission timeout associated with the flow; and
adjust the other congestion window value to match the congestion window value based on detecting the retransmission timeout.

5. The device of claim 1, where the one or more processors are further to:
determine that a quantity of packets associated with a first buffer satisfies a threshold; and
increase a receive window value based on determining that the quantity of packets associated with the first buffer satisfies the threshold,
the receive window value being associated with a second buffer.

6. The device of claim 1, where the one or more processors are further to:
provide a first message to the user device;
receive a second message, from the user device, based on providing the first message; and
where the one or more processors, when determining the plurality of round-trip time threshold values, are to:
determine at least one of the plurality of round-trip time threshold values based on receiving the second message.

7. The device of claim 1, where the one or more processors are further to:
determine a receive window value associated with the user device; and
where the one or more processors, when determining the congestion window threshold value, are to:
determine the congestion window threshold value based on determining the receive window value associated with the user device.

8. A non-transitory computer-readable medium storing instructions, the instructions comprising:
one or more instructions that, when executed by one or more processors of a device, cause the one or more processors to:
determine a high round-trip time threshold value and a low round-trip time threshold value;
determine a round-trip time value and a first smoothed round-trip time value,
the round-trip time value and the first smoothed round-trip time value being associated with a flow,
the flow being associated with the device and a user device;
determine one or more weight values,
the one or more weight values including one or more of:
a weight value based on comparing the round-trip time value to a round trip time pass filter threshold value,
a weight value based on comparing the first smoothed round-trip time value to the high round-trip time threshold value, or
a weight value based on comparing the first smoothed round-trip time value to the low round-trip time threshold value;
determine a second smoothed round-trip time value based on the high round-trip time threshold value, the low round-trip time threshold value, the round-trip time value, the first smoothed round-trip time value, and the one or more weight values;
determine a congestion window threshold value based on the second smoothed round-trip time value and at least one congestion window limit,
a congestion window limit, from the at least one congestion window limit, including a value associated with an advertise receive window associated with the user device;
determine a congestion window value based on the congestion window threshold value and the at least one congestion window limit; and
provide traffic associated with the flow based on the congestion window value.

9. The non-transitory computer-readable medium of claim 8, where the one or more instructions, when executed by the one or more processors, further cause the one or more processors to:
determine another round-trip time value;
compare the other round-trip time value with a high bound and a low bound associated with the high round-trip time threshold value; and
where the one or more instructions, that cause the one or more processors to determine the high round-trip time threshold value, cause the one or more processors to:

determine the high round-trip time threshold value based on comparing the other round-trip time value with the high bound and the low bound.

10. The non-transitory computer-readable medium of claim 8, where the one or more instructions, when executed by the one or more processors, further cause the one or more processors to:
compare the second smoothed round-trip time value and the high round-trip time threshold value; and
where the one or more instructions, that cause the one or more processors to determine the congestion window threshold value, cause the one or more processors to:
determine the congestion window threshold value based on comparing the second smoothed round-trip time value and the high round-trip time threshold value.

11. The non-transitory computer-readable medium of claim 8, where the one or more instructions, when executed by the one or more processors, further cause the one or more processors to:
increase the congestion window value to another congestion window value; and
increase a receive window value based on increasing the congestion window value to the other congestion window value.

12. The non-transitory computer-readable medium of claim 8, where the flow is a first transmission control protocol flow,
the first transmission control protocol flow being associated with the device and the user device; and
where the one or more instructions, when executed by the one or more processors, further cause the one or more processors to:
cause a second transmission control protocol flow to be established with another device,
the device receiving the traffic from the other device.

13. The non-transitory computer-readable medium of claim 8, where the one or more instructions, when executed by the one or more processors, further cause the one or more processors to:
determine that a quantity of packets associated with a first buffer satisfies a threshold,
the packets to be provided to the user device; and
increase a receive window value associated with a second buffer based on determining that the quantity of packets associated with the first buffer satisfies the threshold.

14. A method, comprising:
determining, by a device, one or more round-trip time threshold values;
determining, by the device, a round-trip time value and a first smoothed round-trip time value,
the round-trip time value and the first smoothed round-trip time value being associated with a flow;
determining, by the device, one or more weight values,
the one or more weight values including one or more of:
a weight value based on comparing the round-trip time value to a round trip time pass filter threshold value, or
a weight value based on comparing the first smoothed round-trip time value to the one or more round-trip time threshold values;

determining, by the device, a second smoothed round-trip time value based on the one or more round-trip time threshold values, the round-trip time value, the first smoothed round-trip time value, and the one or more weight values;
determining, by the device, a congestion window threshold value based on the second smoothed round-trip time value and at least one congestion window limit,
a congestion window limit, from the at least one congestion window limit, including a value associated with an advertise receive window associated with a user device;
determining, by the device, a congestion window value based on the congestion window threshold value and the at least one congestion window limit; and
providing, by the device, traffic associated with the flow based on the congestion window value.

15. The method of claim 14, further comprising:
comparing the second smoothed round-trip time value and the one or more round-trip time threshold values; and
where determining the congestion window threshold value based on the second smoothed round-trip time value and at least one congestion window limit comprises:
determining the congestion window threshold value being a high congestion window limit, of the at least one congestion window limit, when the second smoothed round-trip time value is less than a low round-trip time threshold value of the one or more round-trip time threshold values.

16. The method of claim 14, further comprising:
adjusting a receive window value based on the congestion window value; and
where providing traffic associated with the flow comprises:
providing traffic associated with the flow based on the congestion window value and the receive window value.

17. The method of claim 14, further comprising:
detecting a retransmission timeout; and
performing a slow-start process based on detecting the retransmission timeout.

18. The method of claim 14, further comprising:
detecting a packet loss associated with the flow; and
adjusting the congestion window value based on detecting the packet loss.

19. The method of claim 14, further comprising:
classifying the flow into one or more states; and
where determining the congestion window threshold value comprises:
determining the congestion window threshold value based on classifying the flow into the one or more states.

20. The non-transitory computer-readable medium of claim 8, where the one or more instructions, when executed by the one or more processors, further cause the one or more processors to:
detect a packet loss associated with the flow; and
set the congestion window value to a value associated with a percentage of the congestion window threshold value based on detecting the packet loss.

* * * * *